United States Patent [19]

Murakami

[11] Patent Number: 4,881,122
[45] Date of Patent: Nov. 14, 1989

[54] THREE-DIMENSIONAL SHOOTING VIDEO CAMERA APPARATUS

[76] Inventor: Kanji Murakami, 7-1-12-102, Minamiaoyama, Minato-ku, Tokyo, Japan

[21] Appl. No.: 277,565

[22] Filed: Nov. 29, 1988

[30] Foreign Application Priority Data

Mar. 29, 1988 [JP] Japan .................................. 63-75350

[51] Int. Cl.$^4$ ........................................... H04N 13/02
[52] U.S. Cl. ...................................... 358/88; 358/210
[58] Field of Search .................... 358/88, 92, 91, 229, 358/210

[56] References Cited

U.S. PATENT DOCUMENTS

| | | | |
|---|---|---|---|
| 3,784,738 | 1/1974 | Natter | 358/88 X |
| 4,559,555 | 12/1985 | Schoolman | 358/210 X |
| 4,751,570 | 6/1988 | Robinson | 358/88 |

Primary Examiner—James J. Groody
Assistant Examiner—Victor R. Kostak
Attorney, Agent, or Firm—Frishauf, Holtz, Goodman & Woodward

[57] ABSTRACT

A 3D shooting video camera apparatus includes two video camera main bodies coupled in such a way that the two video cameras operate in synchronism and with the same shooting conditions. A 3D effect adjusting mechanism is mounted to the apparatus to facilitate the adjustment, in the shooting direction, of the cross point of the optical axes of the two video camera main bodies.

3 Claims, 3 Drawing Sheets

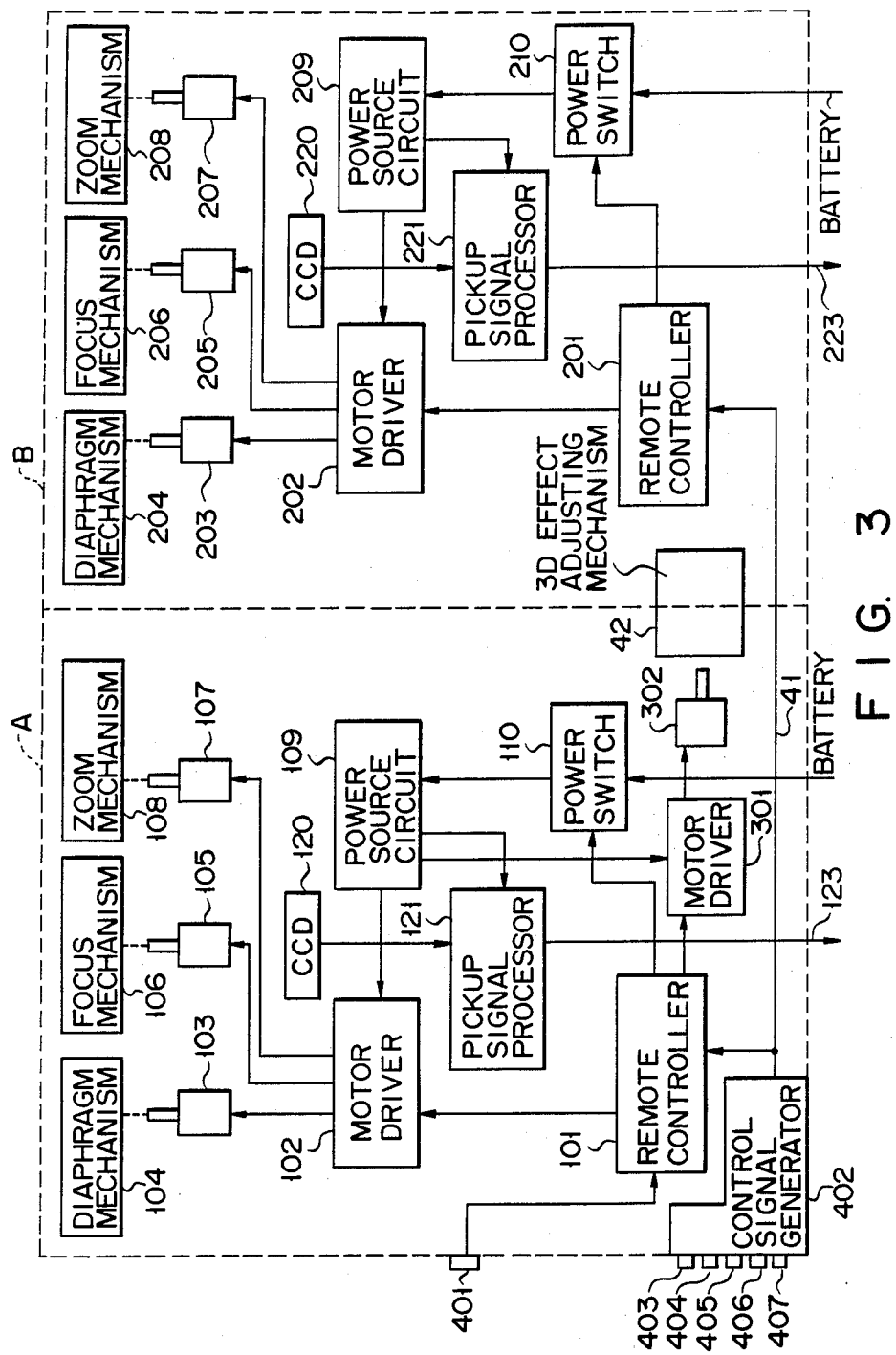
F I G. 3

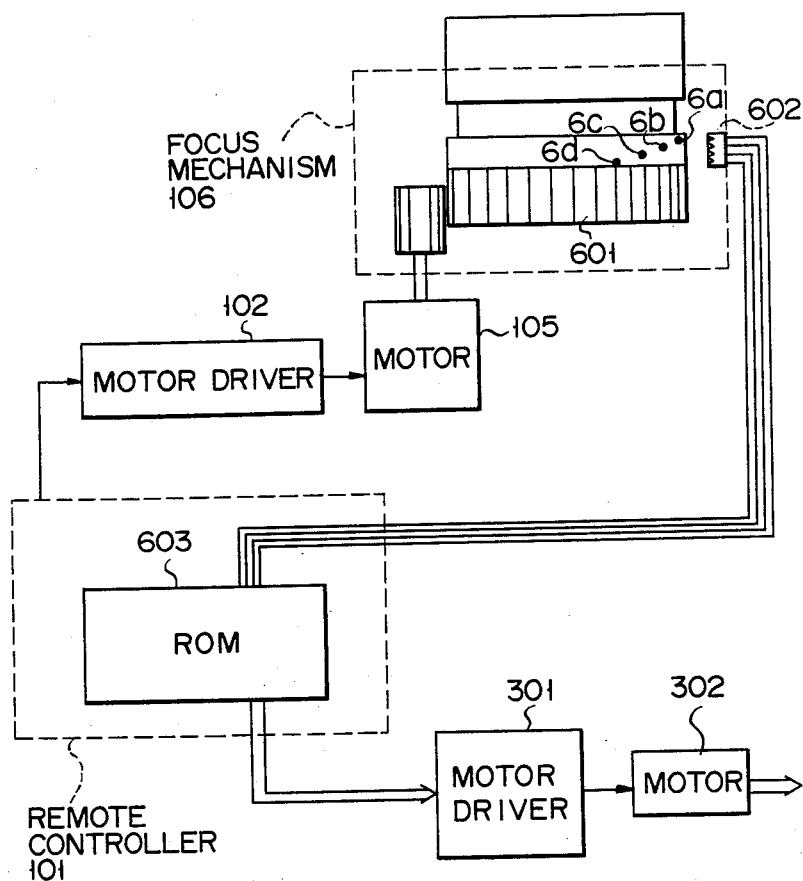
F I G. 4

THREE-DIMENSIONAL SHOOTING VIDEO CAMERA APPARATUS

BACKGROUND OF THE INVENTION

1. Field of the Invention

The present invention relates to a three-dimensional (3D) shooting video camera apparatus which uses two video cameras to acquire video signals for a 3D image.

2. Description of the Related Art

In acquiring video signals for a 3D image using video cameras, independent right and left video cameras and first and second video tape recorders (hereinafter referred to as VTR) for respectively recording the pickup outputs of the video cameras are provided. The same object is picked up at different angles by these two video cameras. That is, the right and left video cameras are disposed with a convergence angle therebetween and pick up the same object. These video cameras are adjusted in such a way as to have the same shooting conditions (diaphragm, focus, zoom, etc.).

The adjustment of the shooting conditions is normally performed for each video camera by a user. In this case, the adjustment of the shooting conditions and convergence angle depends on the experience and skill of the user. If it is a novice who performs such adjustment, it is not likely that the acquired video signals will produce a good 3D effect. For instance, such a person may undesirably set the diaphragm, focus and zoom for one video camera differently from those for the other video camera by mistake.

SUMMARY OF THE INVENTION

Accordingly, it is an object of this invention to provide a 3D shooting video camera apparatus which can easily provide video signals for producing a good 3D effect and is easy to operate.

To achieve the object, there is provided a 3D shooting video camera apparatus comprising:

first and second video camera main bodies each having a condition setting device built therein for setting shooting conditions, such as diaphragm, focus and zoom, of a lens section and each having a controller built therein for controlling the shooting conditions in accordance with a control signal;

a coupling mechanism for coupling the first and second video camera main bodies to each other so as to face a shooting point in a horizontal plane, for supporting, at one end, a front portion of the first video camera main body to make the first video camera main body horizontally rotatable and for supporting, at another end, a front portion of the second video camera main body to make the second video camera main body horizontally rotatable;

a 3D effect adjusting mechanism for performing adjustment, in a shooting-direction, of a cross point of optical axes of the lens sections of the first and second video camera main bodies which cross each other in front of the first and second video camera main bodies, the 3D effect adjusting mechanism having one end coupled to a rear portion of the first video camera main body and another end coupled to a rear portion of the second video camera main body, whereby an interval between the rear portions of the first and second video camera main bodies can be adjusted by adjusting positions of where the 3D effect adjusting mechanism is coupled to the first and second video camera main bodies; and shooting condition setting means for setting the shooting conditions for the first video camera main body the same as the shooting conditions for the second video camera main body, the shooting condition setting means including a circuit for guiding data input to the controller of the first video camera main body to an input section of the controller of the second video camera main body.

BRIEF DESCRIPTION OF THE DRAWINGS

FIG. 3 is a block diagram illustrating a control system for the 3D shooting video camera apparatus of this invention; and FIG. 4 is a block diagram illustrating a control system for the 3D effect adjusting mechanism for use in this invention.

DETAILED DESCRIPTION OF THE PREFERRED EMBODIMENT

An embodiment of this invention will be described below with reference to the accompanying drawings.

According to this invention, the shooting conditions (such as diaphragm, focus and zoom) for two video camera main bodies are surely and automatically set equal to (i.e., the same as) each other. This can provide video signals capable of producing a high-quality 3D image. In addition, in order to attain video signals that can produce a good 3D effect, the present 3D shooting video camera apparatus is so designed as to facilitate the shooting-directional adjustment of the cross point between the optical axes of the lens sections of the two video camera main bodies.

Figure 1:
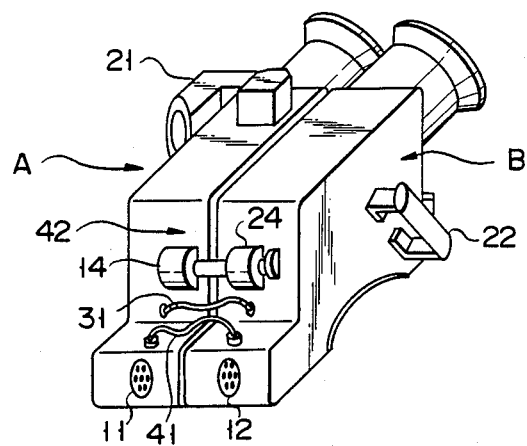
FIG. 1 is a perspective view illustrating a 3D shooting video camera apparatus according to one embodiment of this invention.

In FIG. 1, first and second video camera main bodies A and B are arranged substantially in parallel to each other, facing substantially the same direction, and are attached to each other by coupling means. The coupling means couples the first and second video camera main bodies to each other so that they face a shooting point in a horizontal plane. Each video camera main body A or B comprises a main body section, an optical section and an electronic circuit section disposed within the main body section; a semiconductor image pickup device using a CCD may be used as an image pickup device. At the rear sections of the video camera main bodies are provided connector sections 11 and 12 for extracting image pickup outputs. The connector sections 11 and 12 are coupled through cables to the connectors of first and second VTRs (not shown). Connector sections 11 and 12 serve to receive power from an external power source as well as to output remote control signals in order to inform the associated VTRs of the operational statuses of video camera main bodies A and B. For instance, when video camera main bodies A and B are set in a shooting mode, control signals are sent out through connectors 11 and 12 to set the associated VTRs in a recording mode. When video camera main bodies A and B stop picking up an image, the VTRs are set in a stop mode by the control signals. Video camera main body A is mounted with a view finder section 21 while video camera main body B is mounted with a handle 22.

Two video camera main bodies A and B need to simultaneously operate to acquire video signals for a 3D image. For this purpose, the image pickup signals of these main bodies A and B should be synchronized with each other both horizontally and vertically. In order to satisfy the synchronization conditions, a sync signal line 31 is provided between synchronization circuits of video camera main bodies A and B. For instance, a sync signal from video camera main body A is supplied to a sync signal amplifier of video camera main body B.

Since video camera main bodies A and B shoot the same object to attain video signals for a 3D image, their shooting conditions should be the same. If their shooting conditions differ, reproduction of the attained video signals cannot provide a high-quality 3D image. Therefore, the control signal generated in first video camera main body A is used as a control signal for controlling the shooting conditions for both of main bodies A and B. This control signal is transferred through a line 41 to second video camera main body B. As a result, the shooting conditions for second video camera main body B are always automatically set identical with the shooting conditions for first video camera main body A. In addition, since adjusting the shooting conditions for first video camera main body A automatically sets the same shooting conditions for the second one, the adjustment is significantly easier as compared with the conventional case where such adjustment is effected independently for each video camera main body.

The individual video signals acquired from first and second video camera main bodies A and B are separately recorded on first and second magnetic tapes by first and second VTRs. In acquiring a 3D image using the reproduction signals from the first and second magnetic tapes, images attained by the individual reproduction signals are superimposed on the same screen. At this time, in order to attain a good 3D effect, it is necessary to set the shooting directions of first and second video camera main bodies A and B so that the optical axes of the lens sections of these video camera main bodies A and B cross each other forward in the shooting-direction. The relation between the cross point of the optical axes and the position of the object significantly influences the 3D effect. For instance, upon reproduction of video signals acquired by shooting the object with the cross point of the optical axes overlapping the position of the object, a viewer can feel that an acquired 3D image is substantially level with the screen. Upon reproduction of video signals acquired with the cross point being set in front of the object (closer to the video camera main bodies A and B), however, it would appear that the acquired 3D image lies farther away than the screen. On the other hand, upon reproduction of video signals acquired with the cross point being set at the back of the object (farther away from the video camera main bodies A and B), it would appear that the acquired 3D image lies in front of the screen, that is, the 3D image comes out of the screen.

In order to properly attain such a 3D effect, it is necessary to adjust the cross point of the optical axes of first and second video camera main bodies A and B in the shooting-direction. Such adjustment of the cross point of the optical axes can be done by adjusting the interval between rear portions of first and second video camera main bodies A and B while maintaining the interval between their front portions.

Figure 2:
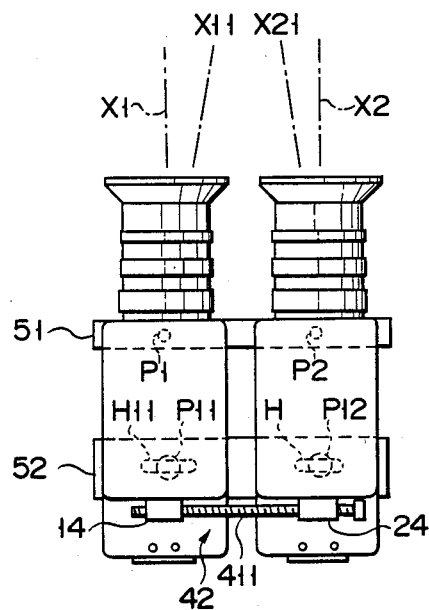
FIG. 2 is a plan view of the FIG. 1 embodiment.

FIG. 2 gives a simple and easy illustration of the coupling means for coupling first and second video camera main bodies A and B and the 3D effect adjusting means.

A connector 51 comprising the coupling means horizontally supports the front portions of video camera main bodies A and B, and has one end portion thereof attached to the bottom of video camera main body A by means of a shaft P1 and the other end portion thereof attached to the bottom of video camera main body B by means of a shaft P2. Therefore, video camera main bodies A and B can be horizontally moved around the respective shafts P1 and P2.

The rear portions of video camera main bodies A and B are horizontally supported by a connector 52 that comprises a 3D effect adjusting mechanism 42. This connector 52 has elongated holes H11 and H12 formed therein to which pins P11 and P12 provided at the bottom of video camera main bodies A and B are fitted. Accordingly, the rear portions of video camera main bodies A and B can be moved closer to, or away from, each other within the range allowed by the elongated holes H11 and H12. This can permit the optical axes X1 and X2 of video camera main bodies A and B to be X11 and X12, respectively. That is, the cross point of the optical axes in front of the cameras can be adjusted in the shooting direction. Drive means for adjusting the cross point of the optical axes comprises bearings 14 and 24 respectively provided at the rear portions of video camera main bodies A and B and a screw 411 fitted in these bearings 14 and 24. Manual or automatic rotating screw 411 can adjust the cross point of the optical axes in the shooting direction.

For automatic adjustment of the cross point, a pulse motor is provided to drive screw 411, and it is controlled by a control signal of a focus adjusting device. The focus adjusting device generates data corresponding to the distance between the object and the cameras, so that the amount of the shooting-directional adjustment of the cross point of the optical axes can be calculated based on this data.

As described above, according to the 3D shooting video camera apparatus of this invention, adjusting the shooting conditions for one video camera main body can easily set the same shooting conditions for the other video camera main body. Further, it is easy to adjust the cross point of optical axes in the shooting direction to attain the desired 3D effect of a reproduced image. Therefore, this 3D shooting video camera apparatus is easy for users to operate.

FIG. 3 illustrates the internal structure of first and second video camera main bodies A and B.

A control signal generator for operating the overall system is provided in each of video camera main bodies A and B, but FIG. 3 shows only a control signal generator 402 of video camera main body A for diagrammatic simplicity. The control signal generator 402 has a recording start/stop key 403, diaphragm control key 404, focus control key 405, zoom control key 406 and power ON/OFF key 407.

When a power ON operation is executed, a command signal from control signal generator 402 is supplied to a remote controller 101 which in turn decodes the command signal to throw a power switch 110 ON. As a result, a source voltage from a battery is supplied to video camera main body A, and a power source circuit 109 supplies the source voltage to the individual circuits within the camera. The same operation is also performed in video camera main body B because the control signal from control signal generator 402 is also supplied through line 41 to a remote controller 201 of video camera main body B.

When a control signal for setting shooting conditions is supplied to remote controller 101, the controller 101 controls a motor driver 102 in accordance with the control signal. Under the control of controller 101, this motor driver 102 controls a motor 103 for driving a diaphragm mechanism 104, a motor 105 for driving a focus mechanism 106, and a motor 107 for driving a zoom mechanism 108. In this case, the shooting conditions for video camera main body B are also automatically set to the same shooting conditions as set for video camera main body A. This is because video camera main body B has the same structure as video camera main body A and comprises the aforementioned remote controller 201, a power switch 210, a power source circuit 209, a motor driver 202, a diaphragm mechanism 204, a focus mechanism 206, a zoom mechanism 208, and motors 203, 205 and 207. The difference between these video camera main bodies A and B lies in that video camera main body B receives a control signal from control signal generator 402 of video camera main body A.

When the start of recording is specified, both of video camera main bodies A and B start shooting the object in synchronism. An optical image is formed in solid state image pickup devices 120 and 220 of video camera main bodies A and B and is subjected to photoelectric conversion there. The outputs of the individual solid state image pickup devices 120 and 220 are respectively supplied to pickup signal processors 121 and 221 which in turn encode the input signals to video signals. The output video signals of pickup signal processors 121 and 221 are supplied to the associated VTRs through output terminals 123 and 223, respectively.

A description will now be given of the operation in a case where the 3D effect adjusting mechanism is set in an automatic mode. In this case, a manual operation key 401 is set in the OFF state. To adjust the focus mechanism, for example, a focus ring of the lens section is rotated by motor 105. Data about the rotational angle is detected by, for example, a photosensor element and is fed back to remote controller 101. Based on fedback distance data, remote controller 101 controls a motor 302 through a motor driver 301 to thereby control 3D effect adjusting mechanism 42 in such a way that the cross point of the optical axes coincides with the position of the object, for example.

FIG. 4 illustrates that portion concerning the 3D effect adjusting device.

A focus ring 601 of focus mechanism 106 is rotated by motor 105. On the periphery of focus ring 601 are provided a plurality of reflecting sections 6a, 6b, 6c, 6d . . . which are shifted in the direction of the rotational shaft as well as in the rotational direction. A sensor 602 for detecting the rotational angle of the ring is provided at a fixed position to face focus ring 601. Sensor 602 has a plurality of photosensor elements corresponding to reflecting sections 6a, 6b, 6c, 6d, etc. The output data of the photosensor elements represents the rotational angle of focus ring 601, which also corresponds to the distance between the object and the lens section. That is, the output data of the photosensor elements is distance data. This distance data is supplied to an address designation section of a ROM 603 in which adjustment data of the cross point of the optical axes is stored in advance in association with different distances. When the focus is adjusted by the rotation of focus ring 601, therefore, motor 302 is controlled by the output data of ROM 603 that corresponds to the amount of the adjustment, and the cross point of the optical axes is automatically adjusted.

As described above, this invention provides a 3D shooting video camera apparatus which is easy to operate and acquires video signals that give a good 3D image.

Needless to say, this invention is in no way limited to the above particular embodiment, but can be modified in various manners within the scope and spirit of the invention as claimed.

What is claimed is:

1. A 3D shooting video camera apparatus comprising:
    first and second video camera main bodies each having a condition setting device built therein for setting shooting conditions including at least one of diaphragm, focus and zoom, of a lens section and each having a controller built therein for controlling said shooting conditions in accordance with a control signal;
    coupling means for coupling said first and second video camera main bodies to each other so as to face a shooting point in a horizontal plane, for supporting, at one end, a front portion of said first video, camera main body to make said first video camera main body horizontally rotatable and for supporting, at another end, a front portion of said second video camera main body to make said video camera main body horizontally rotatable;
    3D effect adjusting means for performing adjustment, in a shooting direction, of a cross point of optical axes of said lens sections of said first and second video camera main bodies which cross each other in front of said first and second video camera main bodies, said 3D effect adjusting means having one end coupled to a rear portion of said first video camera main body and another end coupled to a rear portion of said second video camera main body, whereby an interval between said rear portions of said first and second video camera main bodies can be adjusted by adjusting positions of where said 3D effect adjusting means is coupled to said first and second video camera main bodies; and
    shooting conditions setting means for setting said shooting conditions for said first video camera main body the same as said shooting conditions for said second video camera main body, said shooting condition setting means including means for guiding data input to said controller of said first video camera main body to an input section of said controller of said second video camera main body.

2. The apparatus according to claim 1, wherein said 3D effect adjusting means includes first and second bearings respectively provided in said first and second video camera main bodies and a screw shaft fitted in said first and second bearings.

3. The apparatus according to claim 2, wherein said 3D effect adjusting means further includes:
    detecting means for detecting rotational angle data of a focus ring of said lens section of said first video camera main body;
    A ROM for, when accessed, outputting control data stored in advance, in accordance with output data of said detecting means; and
    drive means for driving a motor to rotate said screw shaft based on said control data from said ROM.

* * * * *